W. Eaton,
Making Glaziers' Points.
No. 2,185. Reissued Mar. 6, 1866.
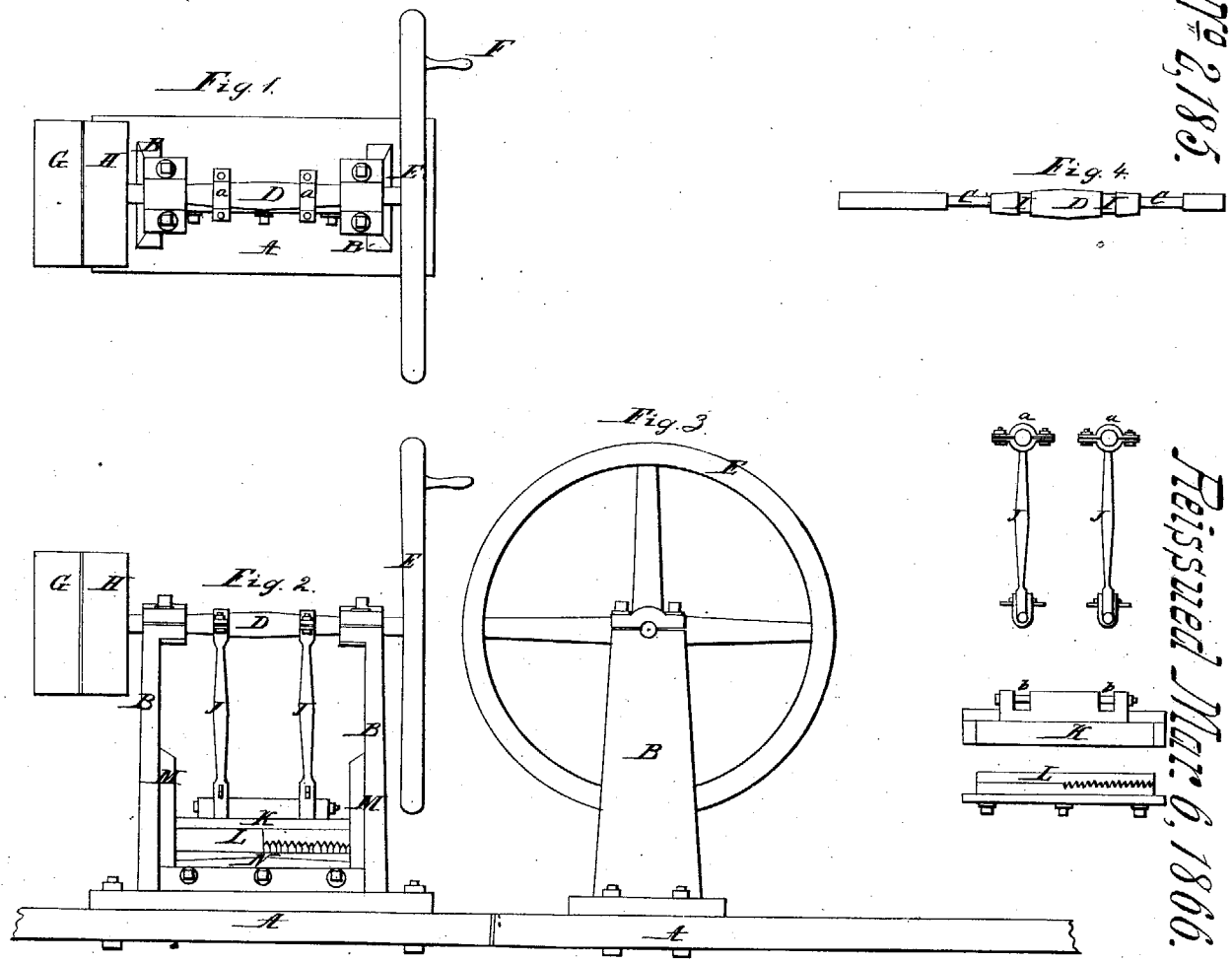
Witnesses:
George Perkins
John Dickson
Inventor:
Ward Eaton
N. PETERS, PHOTO-LITHOGRAPHER, WASHINGTON, D. C.

UNITED STATES PATENT OFFICE.

THOMAS BRACHER, OF NEW YORK, N. Y., ASSIGNEE, BY MESNE ASSIGNMENTS, OF WARD EATON.

IMPROVED MACHINE FOR SERRATING SHEET METAL.

Specification forming part of Letters Patent No. 10,925, dated May 16, 1854; Reissue No. 2,185, dated March 6, 1866.

*To all whom it may concern:*

Be it known that WARD EATON, of Carbondale, Luzerne county, Pennsylvania, did invent certain new and useful Improvements in Machines for Cutting Sheet Metal, of which I do hereby declare the following to be a full, clear, and exact description, reference being had to the accompanying drawings, figures and letters of reference thereon, making part of this specification, in which—

Figure 1 represents a plan or top view. Fig. 2 represents a front elevation. Fig. 3 represents an end view, and Fig. 4 represents portions detached from the machine.

Similar letters of reference indicate like parts in all the drawings.

The invention relates to the forming and operating of cutting-dies so that one die shall cut from the plate a number of perfect articles, and at the same time form the side or sides of the remaining portion of the plate, which articles are finished by the straight blade or cutter of the pair.

To enable others skilled in the art to make and use this invention, I will describe the construction and operation thereof.

A represents the base of the machine, and B the uprights, which are provided at top with suitable bearings for the journals *c c* of the cam-shaft D to rotate in.

F is a crank, by means of which motion may be communicated to the cutters.

I I are two eccentrics arranged on the shaft D, around which pass the strap *a a* of the connectinn-rods J J, the other ends of said connecting-rods being attached at *b* to the cross-head K, to which the cutting-dies are attached. The cross head K is raised and lowered through the action of the eccentrics I I and connecting-rods J J by the rotation of the shaft D, and the cross-head is kept in position by the guides M M in its movements, so as to keep the cutting-edges close up against the stationary blade N. The cutting-edges of the blade L are inclined to that of the blade N, so as to give them a shear cut, so that the cutting shall commence at one edge and cut but one article at a time, whereby a great saving in power to drive the machine is effected, and the articles are not bent or warped by the action of the cutters.

The operation of the machine will be as follows: A sheet of material is placed upon the serrated die, and, the two dies being brought together, a quantity of articles equal to the number of serrations in the die are cut out and finished at the first stroke, and the proper serrations or shape for another set of equal number is made. The plate with these serrations is then placed over the straight die and the articles are cut off with a shear cut, one by one.

The advantages of this machine are, that there is no waste of material from which the articles are cut, and they are cut perfectly straight and flat, and are easily driven by the users.

Having thus described the improvements, what is claimed as the invention of said WARD EATON is—

1. The cutters attached to the reciprocating cutter-stock K—that is to say, the series of serrated cutters and the straight shear-cutter, whose cutting surfaces or edges lie in the same or different horizontal planes, in combination with the stationary series of serrated cutters and stationary shear-cutter, whose cutting surfaces or edges lie in inclined planes, substantially as set forth.

2. Arranging serrated dies in series so as to operate with a shear cut, substantially as described.

THOS. BRACHER.

Witnesses:

C. A. DURGIN,

EDWARD OSBORN.